(12) United States Patent
Egold et al.

(10) Patent No.: US 6,684,688 B1
(45) Date of Patent: Feb. 3, 2004

(54) ARRANGEMENT FOR SIMULATING FORCE EFFECTS ON A WHEEL OF A MOTOR VEHICLE RESULTING DURING OPERATION OF THE MOTOR VEHICLE

(75) Inventors: Karl Egold, Paderborn (DE); Hermann Relard, Delbrück (DE); Michael Wingenbach, Paderborn (DE)

(73) Assignee: Benteler AG, Paderborn (DE)

( * ) Notice: Subject to any disclaimer, the term of this patent is extended or adjusted under 35 U.S.C. 154(b) by 170 days.

(21) Appl. No.: 09/829,009

(22) Filed: Apr. 18, 2001

(30) Foreign Application Priority Data

Nov. 23, 2000 (EP) .............................................. 00125654

(51) Int. Cl.⁷ .............................................. G01M 15/00
(52) U.S. Cl. ..................................... 73/118.1; 73/118.1
(58) Field of Search .............................. 73/118.1, 669, 73/865.6; 301/46, 44, 45, 47, 50–53

(56) References Cited

U.S. PATENT DOCUMENTS

| | | | | |
|---|---|---|---|---|
| 3,780,837 A | * | 12/1973 | Haydu | ........................ 188/195 |
| 4,387,930 A | * | 6/1983 | Hunt | ........................... 301/46 |
| 5,083,453 A | * | 1/1992 | Daley | ........................ 73/118.1 |

FOREIGN PATENT DOCUMENTS

EP 0181411 11/1984

* cited by examiner

Primary Examiner—Kamand Cuneo
Assistant Examiner—Monica D. Harrison
(74) Attorney, Agent, or Firm—Friedrich Kueffner

(57) ABSTRACT

An arrangement for simulating force effects of a vehicle wheel has a multi-part housing and a frame-shaped wheel adapter mounted on the housing and arranged in a vertical plane. The wheel adapter defines a wheel center and a ground contact point of the wheel in the vertical plane. A first push rod is articulated on the wheel adapter and extends in a horizontal plane intercepting the vertical plane at the wheel center. It simulates a first longitudinal force. The wheel adapter has a U-shaped cutout near the ground contact point which is penetrated by a vertical bolt extending in the vertical plane through the wheel center and the ground contact point and connected by a first joint to the housing. A second push rod is connected to the housing transversely to the vertical plane. The axis of the second push rod intercepts the ground contact point and simulates a lateral force. A third push rod is rotated 90° to the second push rod and has an axis extending in the vertical plane through the ground contact point. It simulates a second longitudinal force and is connected by a second joint to the housing. The first and second joints have center points coinciding with the ground contact point. A force introduction member is articulated coaxially on the vertical bolt below the U-shaped cutout on the wheel adapter.

7 Claims, 3 Drawing Sheets

ARRANGEMENT FOR SIMULATING FORCE EFFECTS ON A WHEEL OF A MOTOR VEHICLE RESULTING DURING OPERATION OF THE MOTOR VEHICLE

BACKGROUND OF THE INVENTION

1. Field of the Invention

The invention relates to an arrangement for simulating the force effects on the wheel of a motor vehicle resulting from operation of the motor vehicle, wherein the arrangement makes it possible to introduce different force effects from the three force directions into a ground contact point of the wheel and to thus simulate the force effects of the street in a driving test.

2. Description of the Related Art

The arrangements which are known in this context are basically complex special constructions with a cost-intensive individual manufacture (usually in-house knowledge not available in published form).

SUMMARY OF THE INVENTION

It is an object of the present invention to provide an arrangement of the aforementioned kind which ensures the same function but is comprised of simple components.

In accordance with the present invention, this is achieved in that a frame-shaped wheel adaptor is provided which is arranged in a vertical plane and which is articulated with a first push rod, extending in a horizontal plane intercepting the wheel center and simulating a longitudinal force, wherein the wheel adaptor has in the area of the fictitious ground contact point of the wheel a U-shaped cutout which is penetrated by a vertical bolt which extends with its longitudinal axis in the vertical plane and intercepts the ground contact point of the wheel and the wheel center and is connected by a first joint with a multi-part housing, which housing is rigidly connected to a second push rod, extending transversely to the vertical plane and with its horizontal longitudinal axis through the ground contact point of the wheel and simulating a lateral force, and is coupled via a second joint with a third push rod, that is rotated by 90° relative to the second push rod, extends with its longitudinal axis in the vertical plane and through the ground contact point of the wheel, and simulates a longitudinal force, wherein the center points of the first and second joints coincide with the ground contact point of the wheel, and wherein the wheel adaptor is articulated on a substantially vertical rod-shaped force introduction member below the cutout whose longitudinal axis extends coaxially to the longitudinal axis of the vertical bolt.

The gist of the invention is the play-free universal joint-type support of the ground contact point of the wheel by means of two joints nestled into one another and having different radii. The directions of the simulated longitudinal force, of the lateral force, and of the vertical force extend through these two joints. All three force directions are positioned substantially perpendicularly relative to one another, but still allow to vary the angles relative to one another within limits. The components which are used for the arrangement according to the invention result in a small configuration size within short manufacturing times, wherein, however, a simple size variation is possible. The simple components allow moreover a simplified maintenance. Accordingly, the entire construction and manufacturing expenditure in comparison to the prior art can be considerably lowered.

By means of the second and third push rods, lateral forces and longitudinal forces can be simulated. The force introduction member simulates the vertical force resulting from the wheel contact on the road surface. Moreover, via the first push rod a further longitudinal force can be simulated. The application of the longitudinal forces via the first and the third push rods makes it possible in a simplified manner to simulate braking torque. The push rods and the force introduction member are subjected to the effect of preferably hydraulically operated cylinders, wherein, in principle, frequencies as desired can be applied. Under certain experimental conditions pneumatically loaded cylinders are also conceivable.

The housing is basically of a fork-shaped configuration with an upper and a lower leg wherein the end faces of the legs are spaced apart and position-secured by a holding plate at the end faces.

According to a further embodiment, it is advantageous when the first joint is comprised of a sleeve secured circumferentially on the vertical bolt and having a spherical section as an outer surface. Moreover, the first joint is comprised of a joint bushing secured in the housing and having an inner surface which is matched to the outer surface of the sleeve. The housing above and below the joint bushing has conically widening inner cutouts. The conically widening inner cutouts are formed within two pressure members which are detachably secured from above and below in corresponding receptacles of the legs.

The conical cutouts of the housing are sized such that all conceivable movements of the housing relative to the vertical bolt can be accommodated. The sleeve preferably rests against a step of the vertical bolt. Its position is secured by a spacer sleeve which extends between the sleeve and the lower horizontal boundary of the U-shaped cutout in the wheel adaptor. Sleeve and spacer sleeve are position-secured via the step on the vertical bolt by means of a setting screw screwed from below into the vertical bolt and supported on the wheel adaptor.

The second joint is advantageously comprised of a sleeve, which is position-secured in the housing so as to surround the first joint and which is provided with an outer surface formed as a spherical section as well as with an inner cylindrical surface, and of an annular swivel head of the third push rod which has an inner surface that is matched to the outer surface of the sleeve.

The sleeve of the second joint is position-secured by means of the pressure members. For this purpose, the pressure members have corresponding cylindrical receptacles for the sleeve.

In order to ensure a proper play-free mounting of the two joints, according to another embodiment a compensation bushing is integrated between the joint bushing of the first joint and the cylindrical inner surface of the sleeve of the second joint. Joint bushing and compensation bushing are supported, on the one hand, directly on the upper pressure member and, by means of a pressure disc, preferably of plastic material, on the lower pressure member.

Mounting of the wheel adaptor as well as of the joints and also maintenance are facilitated and simplified when, according to a further embodiment, the wheel adaptor is of a two-part construction and the vertical bolt is detachably integrated between the two parts. In this connection, the vertical bolt, which is optionally of a multi-part construction, engages with its cylindrical longitudinal section a corresponding cutout of the lower part of the wheel adaptor. At the upper end the vertical bolt has a flange-shaped console which is screwed onto the upper horizontal boundary of the U-shaped cutout which is a component of the upper part of the wheel adaptor. The vertical bolt is securely axially centered between the two parts of the wheel adaptor by means of a central pin, which begins at the console and engages in the upward direction a cutout of the upper part.

Also, the force introduction member which extends substantially vertically and is rod-shaped is coupled with the wheel adaptor by a joint. For this purpose, the wheel adaptor has two downwardly oriented brackets. The brackets are penetrated in the horizontal direction by a support bolt. The support bolt supports a bolt sleeve with an outer surface having a spherical section contour. It is engaged from the exterior by a surface-matched ring-shaped swivel head which is connected to the force introduction member. The sleeve is position-secured in the axial direction of the support bolt relative to the two brackets by spacer bushings.

In order for the wheel adaptor to be secured in its position for force introduction from the three force directions, according to a further embodiment a slanted strut is positioned between the lower end portion of the force introduction member and a connecting flange, provided for connecting the force introduction member to the wheel adaptor and displaced laterally relative to the vertical plane. This slanted strut is detached, i.e., made inoperative, when braking torque is to be simulated by means of the first push rod as well as the third push rod.

DESCRIPTION OF THE PREFERRED EMBODIMENTS

Figure 1:
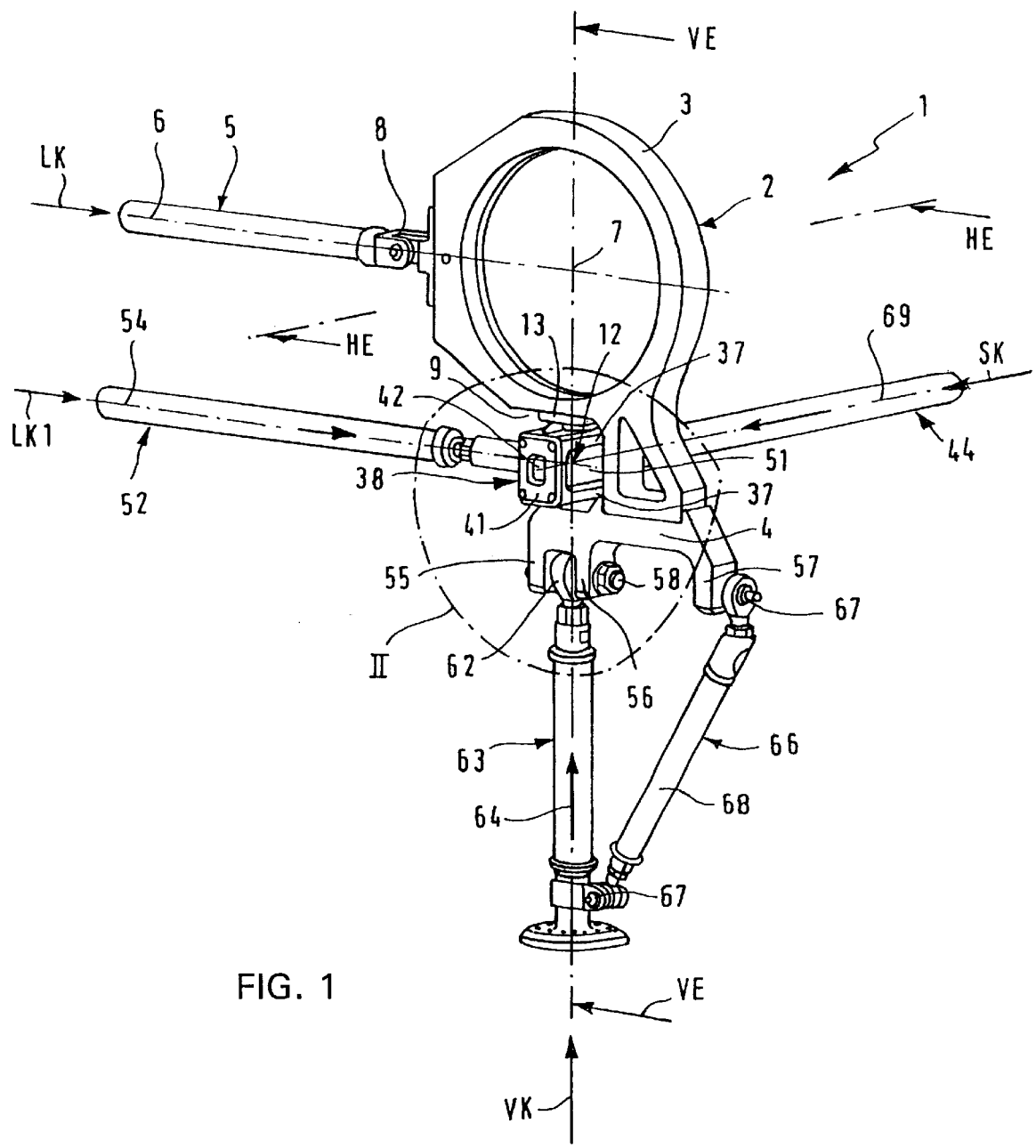
FIG. 1 shows in a schematic perspective view an arrangement for simulating the force effects of the wheel of a motor vehicle resulting from operation of the motor vehicle.
Figure 2:
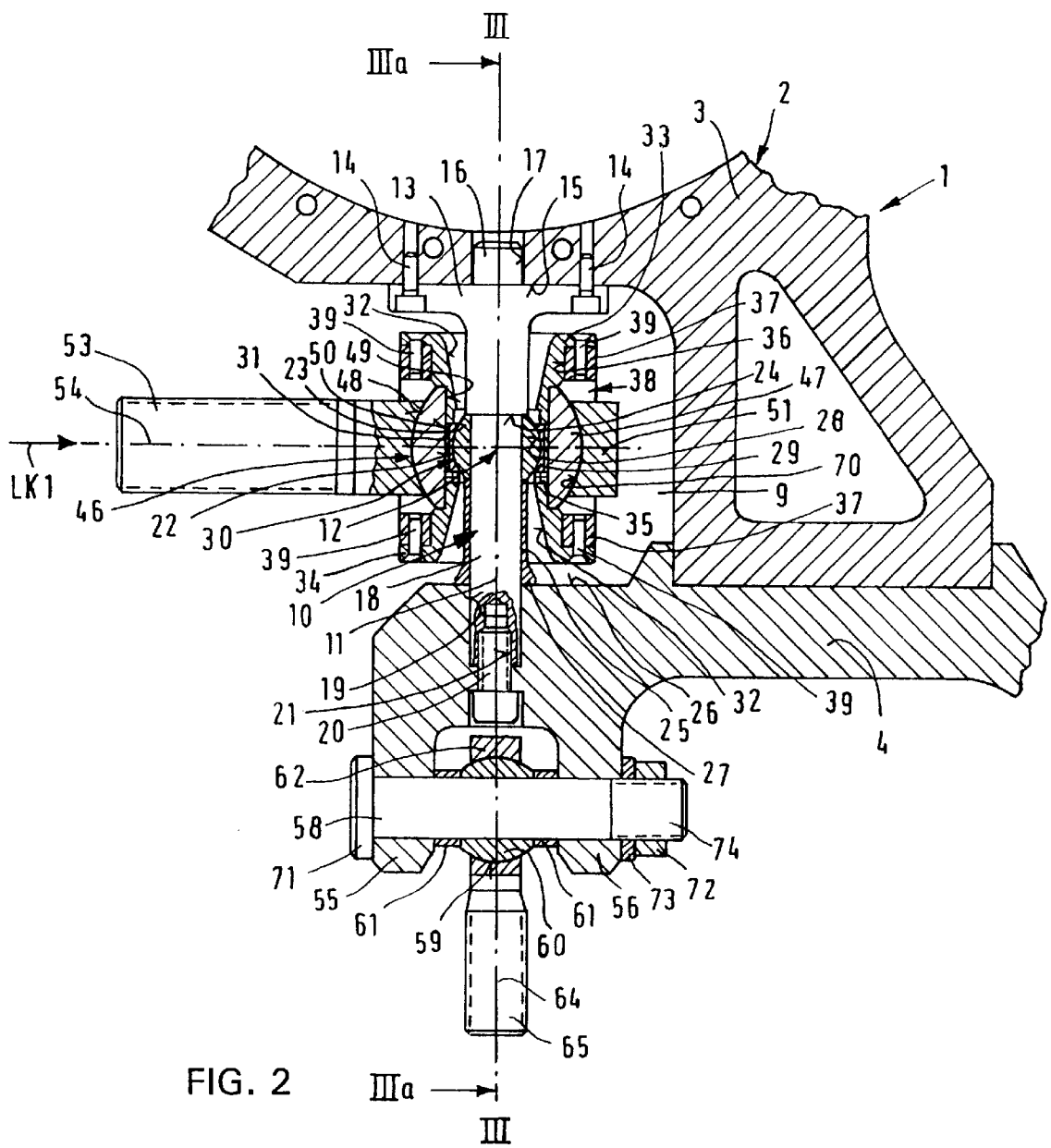
FIG. 2 is an enlarged representation of the detail II of FIG. 1 in a vertical longitudinal section.
Figure 3:
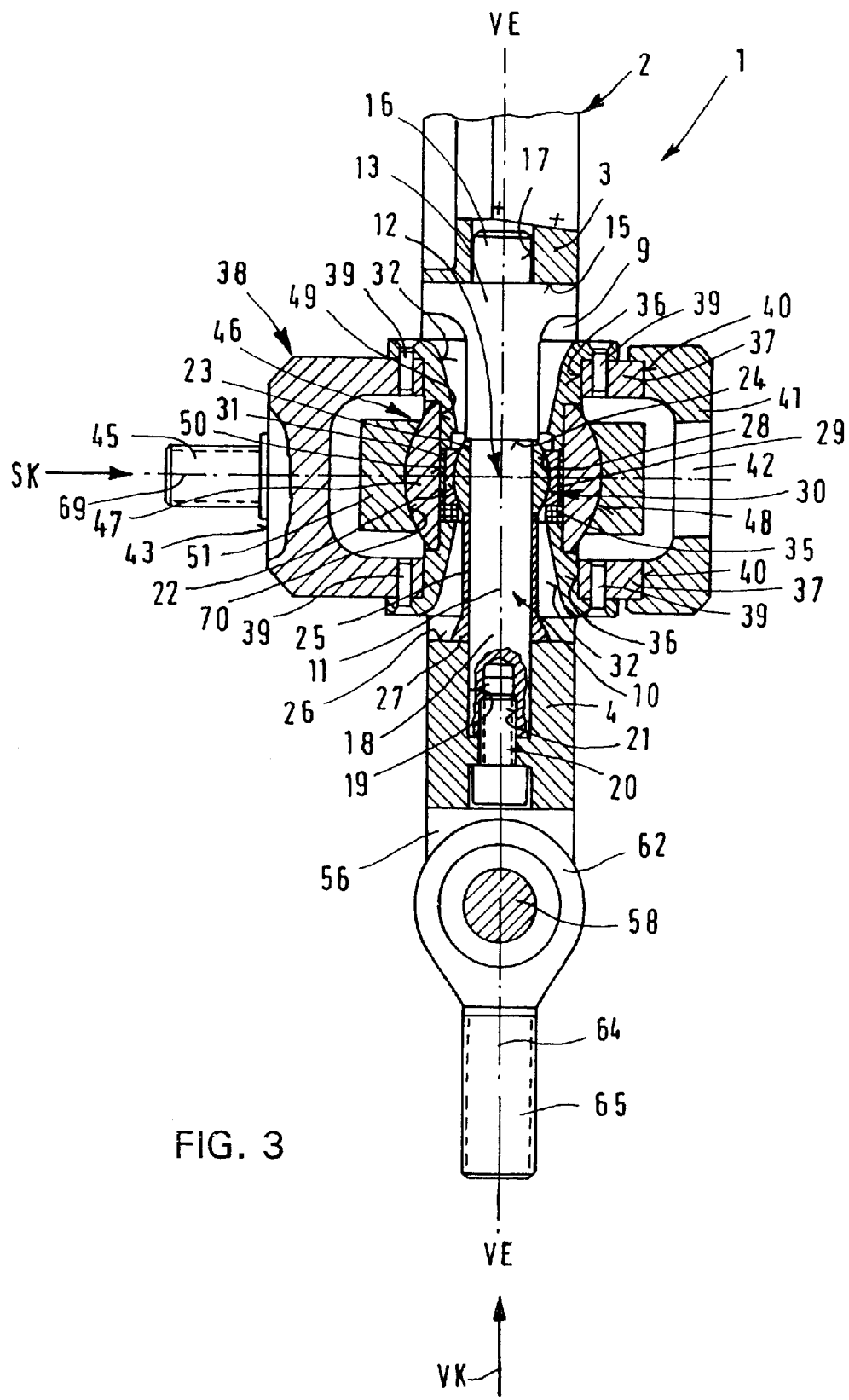
FIG. 3 is a vertical cross-sectional view of the illustration of FIG. 2 along the line III—III in the direction of arrow IIIa.

FIGS. 1 through 3 show an arrangement 1 for simulating the force effects on the wheel of a motor vehicle which occur during operation of the motor vehicle.

The arrangement 1 comprises a frame-shaped wheel adaptor 2 arranged in a vertical plane VE which is comprised of an upper part 3 for receiving, for example, the wheel hub with accessories and a lower part 4 which is detachably and positive-lockingly connected to the upper part 3.

A first push rod 5 is articulated on the upper part 3 on one side. The push rod 5 extends with its longitudinal axis 6 in a horizontal plane HE (FIG. 1) which intersects the wheel center 7. The first push rod 5 serves for simulating the longitudinal force LK in the direction toward the wheel center 7 which force can be generated, for example, by means of a hydraulic cylinder, not represented, which optionally can be operated in a pulsed fashion. The joint 8 between the first push rod 5 and the upper part 3 is a joint allowing three-dimensional movement.

The U-shaped cutout 9 is delimited by the upper part 3 and the lower part 4 of the wheel adaptor 2 and is penetrated by a vertical bolt 10. The longitudinal axis 11 of the vertical bolt 10 extends through the ground contact point 12 of the wheel located in the area of the cutout 9 as well as within the vertical plane VE extending through the ground contact point 12 and the wheel center 7.

The vertical bolt 10 has at its upper end a flange-like console 13 via which by means of screw bolts 14 it is secured on the underside 15 of the upper part 3 of the wheel adaptor 2 which forms the upper boundary of the cutout 9. A pin 16 projects in the upward direction from the console 13 which engages in a centering fashion a bore 17 of the upper part 3.

A cylindrical longitudinal section 18 adjoins the console 13 in the downward direction. It has a smaller diameter and is inserted in a positive-locking way into a stepped bore 19 of the lower part 4 of the wheel adaptor 2. The longitudinal section 18 is secured by means of a screw bolt 20 which is screwed from below through the stepped bore 19 into a threaded bore 21 of the longitudinal section 18. The longitudinal section 18 can be detachably connected to the console 13.

The upper end of the cylindrical longitudinal section 18 of the vertical bolt 10 is surrounded and embraced by a sleeve 23 which has an outer surface 22 in the shape of a spherical section. The radius of the surface 22 ends at the ground contact point 12 of the wheel. The sleeve 23 is secured on the step 24 of the vertical bolt 10, which step 24 is formed by the console 13 and the cylindrical longitudinal section 18, by means of a spacer sleeve 25 which is supported on the upper side 26 of the lower part 4 of the wheel adaptor 2 forming the lower boundary of the U-shaped cutout 9. The lower end 27 of this spacer sleeve 25 is of a thicker configuration.

The sleeve 23 forms together with the joint bushing 29, matched with regard to its inner surface 28 to the outer surface 22 of the sleeve 23, a first joint 30. The joint bushing 29 is position-secured together with the compensation bushing 31 surrounding it between two pressure members 33, 34 provided with an inner conical cutout 32, respectively. The cutouts 32 widen in the upward and downward direction. The fixation moreover is provided by a pressure disc 35 of plastic material. The pressure members 33, 34 engage from above and from below cutouts 36 of the legs 37 of a fork-shaped housing 38. They are secured by screw bolts 39 on the legs 37. The end faces 40 of the legs 37 are connected to one another by a securing plate 41. The securing plate 41 is provided with a central opening 42 and is screwed to the end faces of the legs 37.

On the end face 43 of the housing 38 opposite the securing plate 41 a second push rod 44 is rigidly fastened by means of a threaded pin 45 via which a lateral force SK can be simulated in the direction of the longitudinal axis 69 onto the ground contact point 12 of the wheel. This second push rod 44 is also, for example, subjected to the effect of a hydraulic cylinder, not represented, which operates optionally in a pulsed fashion.

Upon fixation of the two pressure members 33, 34 on the legs 37 of the housing 38, a sleeve 47, forming a component of the second joint 46, with an outer surface 48 having the shape of a spherical section as well as a cylindrical inner surface 49 is secured at the same time. The compensation bushing 31 is positioned between the inner surface 49 of the sleeve 47 and the outer surface 50 of the joint bushing 29 of the first joint 30.

An annular swivel head 51 of the third push rod 52 is matched to the outer surface 48 of the sleeve 47. The third push rod 52 is detachably connected by a threaded pin 53 to the swivel head 51. The longitudinal axis 54 of the third push rod 52 extends in the vertical plane VE of the wheel adaptor 2 through the ground contact point 12 of the wheel. The third push rod 52 is also subjected to the effect of a hydraulic cylinder (not illustrated) which can also be operated in a pulsed fashion.

By means of the third push rod 52 a longitudinal force LK1 can be simulated in the direction toward the ground contact point 12 of the wheel. The third push rod 52 is positioned below the first push rod 5 but is rotated by 90° relative to the second push rod 44.

The lower part 4 of the wheel adaptor 2 is provided with a total of three downwardly projecting brackets 55, 56, 57. Two brackets 55, 56 are arranged as a pair and receive the horizontally extending support bolt 58. The support bolt 58 is embraced by a bolt sleeve 60 that has an outer surface 59 in the form of a spherical segment and is position-secured by two spacer sleeves 61 relative to the brackets 55, 56. The outer surface 59 of the bolt sleeve 60 is embraced by a ring-shaped (annular) swivel head 62 which is shaped accordingly. The swivel head 62 forms a component of a rod-shaped force introduction member 63 whose longitudinal axis 64 extends coaxially to the longitudinal axis 11 of the vertical bolt 10. This force introduction member 63 can be subjected to the action of a hydraulic cylinder, not illustrated, which can also be operated in a pulsed fashion. The connection of the force introduction member 63 with the swivel head 62 is realized by a threaded pin 65 correlated with the swivel head 62.

The position of the support bolt 58 is ensured by its head 71 and a nut 72, wherein the nut 72, with interposition of a washer 73, is threaded onto the threaded portion 74 of the support bolt 58.

The third bracket or connecting flange 57 which is laterally spaced from the pair of brackets 55, 56 is provided for securing the slanted strut 66. The slanted strut 66 is connected to the connecting flange 57 as well as to the lower end portion of the force introduction member 63 by means of joints 67. The longitudinal axis 68 of the strut 66 extends in the vertical plane VE.

As already mentioned above, by means of the first and third push rods 5, 52 it is possible to simulate longitudinal forces LK, LK1 resulting from operation of the motor vehicle. The loading of both push rods 5, 52 is to be applied when braking torque is to be simulated. In this case, the slanted strut 66 must be removed.

Via the second push rod 44, lateral forces SK can be simulated, and via the force introduction member 63 vertical forces VK for wheel contact on the road surface can be simulated.

While specific embodiments of the invention have been shown and described in detail to illustrate the inventive principles, it will be understood that the invention may be embodied otherwise without departing from such principles.

What is claimed is:

1. In an arrangement for simulating force effects on a wheel of a motor vehicle resulting during vehicle operation, the arrangement including a wheel adaptor having a U-shaped cutout, the wheel adaptor being connected through a first joint to a second push rod configured to simulate a lateral force, and to a rod-shaped force introduction member configured to exert a vertical force, wherein the force introduction member extends essentially vertically underneath the cutout, a third push rod configured to simulate a first longitudinal force being coupled to a second joint, wherein the first and second joints have center points which coincide with each other, the improvement comprising the wheel adaptor being frame-shaped and extending in a vertical plane, and the wheel adaptor being articulated to a first push rod configured to simulate a second longitudinal force, wherein the first push rod extends in a horizontal plane which intersects a center point of the wheel;

the cutout being located in an area of a wheel contact point which coincides with the center points of the first and second joints, wherein a vertical bolt extends through the cutout, wherein the vertical bolt extends with a longitudinal axis thereof in a vertical plane extending through the wheel contact point and the center point of the wheel;

the vertical bolt being coupled through the first joint to a multi-part housing, the housing being rigidly connected to the second push rod, wherein the second push rod extends with a horizontal longitudinal axis thereof through the wheel contact point, and wherein the housing is coupled through the second joint to the third push rod, wherein the third push rod is rotated by 90° relative to the second push rod and extends with a longitudinal axis thereof in the vertical plane and through the wheel contact point; and a longitudinal axis of the force introduction member extends coaxially with the longitudinal axis of the vertical bolt.

2. The arrangement according to claim 1, wherein the first joint comprises a first sleeve having a outer surface in the form of a spherical section, wherein the first sleeve is secured on the circumference of the vertical bolt, and further comprises a joint bushing having an inner surface matched to the outer surface of the first sleeve, wherein the joint bushing is fixed within the multi-part housing, wherein the multi-part housing has conically widening inner cutouts above and below the joint bushing.

3. The arrangement according to claim 2, wherein the second joint comprises a second sleeve having an outer surface in the form of a spherical section and a cylindrical inner surface, wherein the second sleeve is secured in the multi-part housing so as to surround the first joint, and further comprises an annular swivel head having an inner surface matched to the outer surface of the second sleeve, wherein the annular swivel head is connected to the third push rod.

4. The arrangement according to claim 3, comprising a compensation bushing positioned between the joint bushing and the second sleeve.

5. The arrangement according to claim 1, wherein the frame-shaped wheel adapter has a first part and a second part and wherein the vertical bolt is detachably positioned between the first and second parts.

6. The arrangement according to claim 1, comprising a support bolt and a bolt sleeve having an outer surface in the form of a spherical segment, wherein the bolt sleeve is seated on the support bolt, wherein the frame-shaped wheel adapter has two brackets and wherein the support bolt penetrates the two brackets, wherein the force introduction member has a ring-shaped swivel head engaging the outer surface of the bolt sleeve.

7. The arrangement according to claim 6, further comprising a strut, wherein the frame-shaped wheel adapter has a connecting flange, configured to connect the force introduction member to the frame-shaped wheel adapter and laterally offset relative to the vertical plane, wherein the force introduction member has a lower end portion, and wherein the strut is connected to the lower end portion of the force introduction member and the connecting flange so as to extend at a slant.

* * * * *